United States Patent [19]

Doggett

[11] Patent Number: 4,757,706

[45] Date of Patent: Jul. 19, 1988

[54] GEOPHONE TESTING

[75] Inventor: William N. Doggett, Bartlesville, Okla.

[73] Assignee: Phillips Petroleum Company, Bartlesville, Okla.

[21] Appl. No.: 33,297

[22] Filed: Mar. 31, 1987

[51] Int. Cl.$^4$ .................................... G01D 18/00
[52] U.S. Cl. .................................... 73/1 DV; 73/1 R; 367/13
[58] Field of Search ................ 73/1 R, 1 DV; 367/13

[56] References Cited

U.S. PATENT DOCUMENTS

| | | | |
|---|---|---|---|
| 2,729,094 | 1/1956 | Piety | 73/1 |
| 2,917,706 | 12/1959 | Thompson | 324/73 |
| 3,903,505 | 9/1975 | Tims | 340/15.5 C |
| 4,366,561 | 12/1982 | Klein | 367/77 |
| 4,392,213 | 7/1983 | King et al. | 73/1 DV X |
| 4,639,901 | 1/1987 | Warmack et al. | 73/1 R X |

*Primary Examiner*—Tom Noland
*Attorney, Agent, or Firm*—William R. Sharp

[57] ABSTRACT

A method and apparatus for testing geophones is provided which utilizes the levitate waveform produced by the geophones upon removal of a levitate current. The levitate waveform is integrated to give an integral value which is proportional to the number of properly functioning geophones in a geophone array, for example.

15 Claims, 3 Drawing Sheets

GEOPHONE TESTING

BACKGROUND OF THE INVENTION

This invention relates to testing of moving-coil type geophones to determine their operability.

A moving-coil geophone comprises a coil of wire suspended in a magnetic field by means of springs. The magnetic field is produced by a permanent magnet which is attached to the case of the geophone. When the geophone is secured to the ground, seismic vibrations cause relative motion between the magnetic field and the coil so as to induce a voltage in the coil. This voltage can be measured to derive conventional seismic traces.

A geophone can be rendered totally or at least partially inoperable in several ways. For example, breakage of the spring mechanism causes total inoperability. Or, a geophone can accidentally fall from its normal vertical position in the field so as to lay on its side in a horizontal position, thus not permitting proper movement of the coil. Geophone performance can also be affected by other factors such as defects in the coil or its associated connections, etc.

Therefore, it is highly desirable before a seismic test to test the operability of an array of geophones which will be used in the field. It is also desirable to test geophones in the laboratory before sending them out to the field so that repairs can conveniently be made.

Various methods for testing geophones have been devised. One common method is to measure instantaneous voltage at two particular points on a levitate waveform produced by the geophones, and also time at two additional points. A levitate waveform is produced by a geophone by applying thereto a current which causes displacement of the coil, and then removing that current to cause the coil to return to its original position. Movement of the coil back to its original position produces a voltage waveform which is commonly known as the levitate waveform. The above-mentioned measurements of amplitude and time are used to compute resonant frequency, damping, and transductance. This technique requires highly accurate measurement of voltage and time, is susceptible to both vibrational and electrical noise, and involves complex computations using natural logarithms or trigonometric functions.

SUMMARY OF THE INVENTION

It is therefore an object of the invention to provide a method and apparatus of testing geophones which provide improved accuracy and which are relatively insensitive to vibrational and electrical noise.

It is also an object of the invention to provide an apparatus and method for testing geophones which are simpler than prior techniques insofar as not requiring complex calculations.

It is yet another object to provide an apparatus and method for testing geophones which require less accurate measurements of voltage to thereby allow the use of cheaper circuitry than in prior techniques.

The above objects are realized in a method for testing at least one moving-coil geophone of the type which includes a movable coil which is displaceable from an original position so as to move through a magnetic field to produce electrical energy, wherein the method comprises: applying an electrical levitate current to the geophone(s) to cause displacement of the coil from its original position; removing the current to cause the coil to return to its original position, the geophone(s) in response thereto producing an output signal having associated therewith a levitate waveform which is characterized by voltage as a function of time; and integrating the levitate waveform by integrating voltage with respect to time to give a levitate integral value $INT_a$ which is indicative of the operability of the geophone(s). As will become more apparent below, $INT_a$ is proportional to the number of functioning geophones.

According to another aspect of the invention, an apparatus is provided which comprises: at least one moving-coil geophone; means for applying an electrical levitate current to the geophone(s) which can be removed to thereby generate a levitate waveform; and electronic means for integrating the levitate waveform whereby the levitate integral value $INT_a$ can be obtained.

According to preferred embodiments of the invention hereinafter described, $INT_a$ is compared to another integral value $INT_n$, which is the integral value expected to be produced by geophone(s) at a predetermined reference temperature. Operability of the geophone(s) is determined based on the comparison. It is also preferred that a temperature dependent correction factor be determined and utilized to correct for errors which are introduced into the comparison of integral values by performing the geophone test at an actual geophone temperature different than the reference temperature.

As discussed further below, the ratio between $INT_a$ and $INT_n$ can be employed to directly derive the number of functioning geophones, requiring no lengthy and complex calculations as in prior techniques. Furthermore, integration of voltage with respect to time over the levitate waveform tends to cancel out noise to thereby improve accuracy of results. Such integration of the levitate waveform also avoids the necessity for expensive circuitry which is necessary in connection with prior techniques to make extremely accurate single point measurements. The temperature correction factor further improves accuracy, particularly in extreme temperature conditions which are many times encountered by geophones in the field.

DETAILED DESCRIPTION OF THE INVENTION

Figure 1:
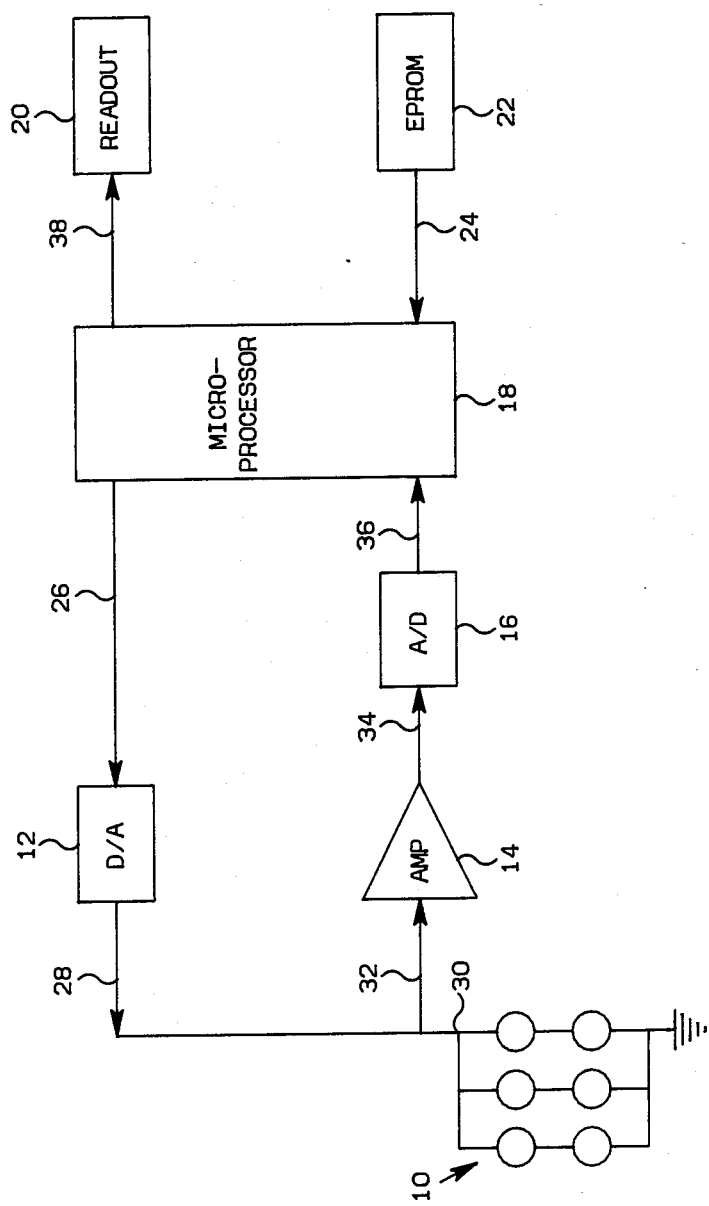
FIG. 1 is a diagrammatic illustration of one embodiment of an apparatus in accordance with the invention for testing an array of geophones.

Preferred embodiments of the invention will now be described with reference to the Figures. It should be understood that various parameter values and ranges given in the following description are given purely by way of example assuming the use of typical 8-10 Hz geophones.

Before describing the invention, however, it is considered appropriate to define and explain certain terms which are used repeatedly throughout the description.

A moving-coil geophone has been adequately defined and described in the Background of the Invention. It shoud also be understood that any references simply to "geophones" refers to moving-coil geophones.

The term "resonant frequency" is a parameter which is equal to the square root of the spring constant (stiffness) divided by the mass of the geophone coil. The resonant frequency is sometimes called the "undamped natural frequency". In the absence of a magnetic field, when the geophone coil is deflected a small distance and then released, the frequency of undamped oscillation of the coil is the resonant frequency. Resonant frequencies of geophones range from 8 to 40 Hz, and are more commonly in the lower end of this range.

The term "transductance" is a parameter which is equal to the average magnetic flux density times the length of the coil conductor and is usually given in units of volts/inch/second or volts/meter/second. Essentially, transductance is a measure of a geophone's sensitivity, or the relationship between output voltage and the velocity of the geophone case. Typical transductance values range from about 20 to about 30 volts/meter/sec.

Geophone "coil resistance" is simply the electrical resistance of the wire which makes up the coil. Geophone coils are typically wound with fine copper wire. Since copper has a temperature coefficient of resistance of about 0.4% per degree Centigrade, the coil resistance can change a significant amount from its room temperature value when geophones are deployed in the field in extreme temperature conditions.

Geophone "damping resistance" is the resistance connected across the coil terminals for the purpose of damping oscillation of the coil. The damping resistance usually takes the form of a high quality resistor of for example ±1% tolerance. A typical damping resistance is about 1000 ohms, but can vary depending on different factors. It is also desirable that the damping resistor have a resistance which is substantially constant over a wide temperature range. For example, a damping resistor with a temperature coefficient of resistance of about 50 ppm/°C. is particularly suitable.

For various calculations discussed below it is necessary to know the values of the above parameters corresponding to a particular geophone. Of course, the damping resistance can be found from typical labeling on the damping resistor, and will be given by the geophone manufacturer if the damping resistor is provided with the geophone. The other parameters discussed above are also typically provided by the geophone manufacturer in the specifications. Values of these parameters, however, can easily be determined by conventional techniques. It is primarily coil resistance which is temperature dependent and which needs to be known at reference temperature conditions (i.e. 25° C. for room temperature) for the purpose of certain calculations discussed below. The coil resistance given by the geophone manufacturer is typically at about 25° C. Other geophone parameters can vary minute amounts in response to large temperature changes, but are assumed herein to be constant.

Referring to FIG. 1, the apparatus shown includes an array of six geophones as indicated at 10, a digital to analog converter 12, a preamplifier 14, an analog to digital converter 16, a microprocessor 18, a suitable readout device 20, and an Erasable Programmable Read Only Memory (EPROM) 22.

The analog to digital converter 16 should be capable of sampling voltage at regular intervals and of generating a succession of digital representations of those voltage measurements. The microprocessor 18 can be any suitable commercially available microprocessor capable of being programmed to perform the calculations hereinafter described. EPROM 22 also can be any commercially available model and usually takes the form of an integrated circuit which is employed to provide an input of various constants, such as transductance, resonant frequency, etc., to microprocessor 18 via line 24. Digital to analog converter 12, preamplifier 14, and readout device 20 are conventional electronic components which also need no extensive explanation. For example, readout device 20 can be, for example, a liquid crystal display readout for displaying various results from the microprocessor 18.

The combination of components in FIG. 1 can be modified in a number of ways as should be apparent to one skilled in the art. For example, microprocessor 18, readout device 20 and EPROM 22 can be replaced by a conventional computer, into which various constants can be entered by means of a keyboard, and which usually has the capability of displaying results of various calculations. However, the simple arrangement shown in FIG. 1 is particularly adaptable to incorporation into a hand held unit which can be taken into the field for optimum convenience and portability.

The geophone testing method using the apparatus of FIG. 1 will now be described. This description also will make reference to FIG. 2 which as noted previously illustrates a typical output of a geophone array in accordance with the invention.

First, microprocessor 18 sends a command signal to digital to analog converter 12 via line 26. This command signal causes converter 12 to produce a predetermined DC levitate current. The current utilized depends on the type of geophones, the manner in which they are connected, and other factors. Typical current values range from about 0.25 to about 2 milliamps, most typically about 0.5 milliamps when using 10 Hz geophones.

It is the usual practice to select a desired coil displacement, and then determine the levitate current necessary to achieve this displacement. This can be done utilizing the equation $$X = \left(\frac{R_d}{R_d + R_c}\right)\left(\frac{GI \times 10^3}{PM(2\pi f_0)^2}\right)$$

where X is the selected coil displacement in millimeters, $R_d$ is the damping resistance in ohms for each individual geophone, $R_c$ is the coil resistance in ohms for each individual geophone at a reference temperature of for example 25° C., G is the transductance in volts/meter/second for each geophone, P is the number of legs of geophones which are connected in parallel (which in this case is 3), M is the coil mass in grams for each individual geophone, $f_0$ is the resonant frequency in Hz of each individual geophone, and finally I is the levitate current in milliamps.

The desired levitate current is produced by digital to analog converter 12 and is delivered to geophone array 10 via line 28. The time period for application of the levitate current to the geophone array should be sufficiently long to allow the output voltage of the geophone array, as measured between point 30 and ground, to stabilize. It can be seen from FIG. 2 that the output voltage quickly reaches a maximum in response to movement of the coil with respect to the geophone magnetic field to thereby induce a voltage. When the coil stops its movement, however, such induced voltage terminates and the output voltage of the geophone array stabilizes. In the example shown in FIG. 2, levitate current has been applied for about 200 milliseconds, which is typical. The time period used depends primarily on the resonant frequency of the geophones.

Figure 2:
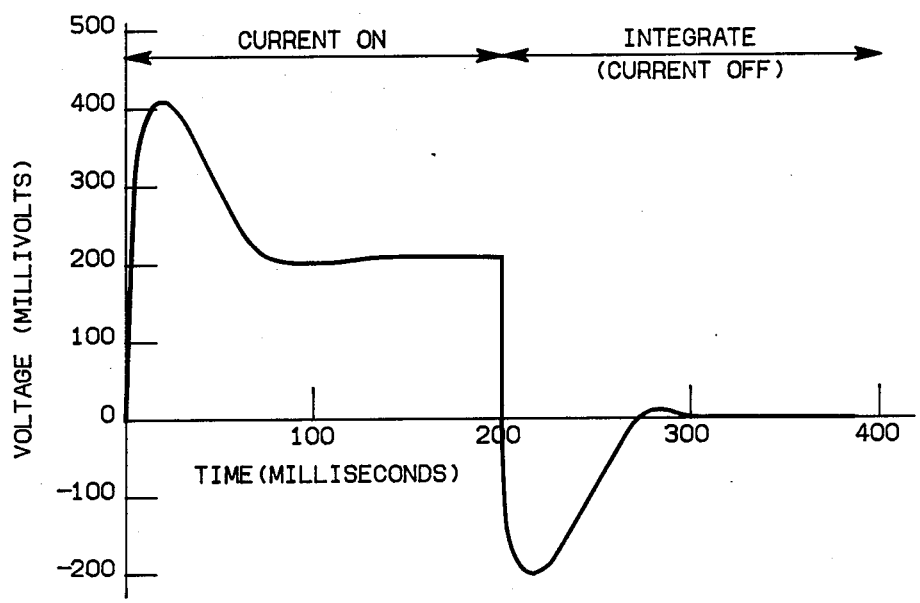
FIG. 2 illustrates one example of a geophone voltage output which can be expected in accordance with the invention.

Microprocessor 18 now sends an appropriate command to digital to analog converter 12 to terminate delivery of levitate current to the geophone array. Upon such removal of the levitate current, the coil in each geophone returns to its original position so as to induce a voltage in the coil. An output signal is accordingly generated by the geophone array. This output signal has associated therewith a levitate waveform which is characterized by voltage as a function of time. This levitate waveform is shown in the example of FIG. 2 as beginning at 200 milliseconds, and reaches a maximum negative voltage very soon thereafter. The coil of each geophone moves so as to slightly past its original position so as to cause the array to produce a small positive voltage just before 300 milliseconds in the illustrated example. The coil then returns permanently to its original position to bring the geophone array voltage output back to zero in response to lack of movement of the geophone coils. Note that only two oscillations occur in the illustrated example because of damping. It should also be noted that the levitate waveform shown results from removal of a negative levitate current, so that a positive levitate current would produce a levitate waveform of opposite polarity.

Preamplifier 14 receives the geophone array output signal via line 32 and amplifies the signal accordingly. The output of preamplifier 14 is fed into analog to digital converter 16 via line 34. Analog to digital converter 16 samples the voltage of the incoming signal at a predetermined sample interval. A typical sample interval is about 0.2 milliseconds. Therefore, a voltage measurement sampling is made every 0.2 milliseconds which corresponds to 5,000 voltage values per second. Analog to digital converter 16 generates a succession of digital representations of such voltage values which are fed into microprocessor 18 via line 36.

Microprocessor 18 is programmed to begin adding each of the voltage values received from converter 16 upon removal of the levitate current, which in FIG. 2 is at 200 milliseconds. Microprocessor 18 is also suitably programmed to sum such voltage measurements for a predetermined period of time, which is the time of integration. The integration time should be long enough to sum all the voltage values along the levitate waveform until the waveform stabilizes and reaches a voltage of zero. For most applications using typical 8 or 10 Hz geophones, an integration time of 200 milliseconds is quite sufficient. Generally, a lower frequency geophone will require a longer integration time. Once the voltage values are summed along the levitate waveform, this resulting sum is multiplied by the sample rate to obtain the levitate integral value $INT_a$, which as will become more apparent below is proportional to the number of functioning geophones in the geophone array. $INT_a$ can be expressed in units of, for example, volt-seconds.

Of course, the above procedure for obtaining $INT_a$ is simply one technique for approximating the integral of voltage with respect to time over the entire levitate waveform. It should be apparent to those skilled in the art that any means of integrating voltage with respect to time over the levitate waveform is within the scope of the present invention.

The microprocessor is further programmed to determine another integral value hereinafter referred to as $INT_n$ which is the integral value expected to be produced by the geophone array 10 at a predetermined reference temperature, which is typically room temperature or about 25° C. $INT_n$ can be determined from the formula $$\frac{SI}{PM}\left(\frac{R_d}{R_d + R_c}\right)^2 \left(\frac{G}{2\pi f_0}\right)^2$$

where $R_d$, $R_c$, G, I, P, M, and $f_0$ are as defined above in connection with displacement X, and where S is the number of geophones connected in series in each parallel leg wherein each leg has an equal number of geophones. $INT_n$ like $INT_a$ can be expressed in units of volt-seconds, assuming the units as described previously for $R_d$, $R_c$, etc. are used. In the geophone array of FIG. 1, S=2. Note in particular that $R_c$, the coil resistance of each geophone, is the coil resistance at the reference temperature which can be 25° C.

A comparison is made between $INT_a$ and $INT_n$ by determining an integral ratio value from the formula $$N\left(\frac{INT_a}{INT_n}\right)$$

where N is the total number of geophones which in FIG. 1 is 6. N can also be expressed as S multiplied by P, which gives the total number of geophones. The integral ratio value is approximately equivalent to the number of functioning geophones of the total number of geophones. Therefore, in the embodiment of FIG. 1 if all of the geophones are properly functioning, the integral ratio value should be about 6. The microprocessor 18 can be programmed to provide a suitable signal to readout device 20 via line 38 to cause readout device 20 to conveniently dispay the integral ratio value.

In actual practice, one can select a range of integral ratio values which are considered to indicate acceptable functioning of the geophone array. For example, for the geophone array of FIG. 1, an integral ratio value between 5.5 and 6.5 can be considered acceptable. If the integral ratio value falls below 5.5, it can be assumed that at least one of the geophones is not functioning properly. To identify the bad geophone in a laboratory situation, each individual geophone can be laid on its side in sequential tests. In a particular test with a good geophone on its side, the integral ratio value should decrease by approximately about 1. A particular test with the bad geophone on its side will not affect the integral ratio value, thus identifying that phone as the bad geophone.

It should also be noted that a percent value, in addition to the integral ratio value, can be determined from the formula $$N\left(\frac{INT_a}{INT_n}\right)100\%$$

If all of the geophones are functioning properly, this formula should give a value of about 100%. If one of the geophones is not functioning properly, the percent value will be typically less than 100%.

Many times, it is preferable that a temperature dependent correction factor is determined to correct for errors introduced into the integral ratio value as a result of applying and removing the levitate current at an actual geophone temperature different than the reference temperature, i.e. 25° C. Use of such a temperature dependent correction factor is particularly beneficial at extreme geophone temperature conditions. As noted previously, the coil resistance $R_c$ of each geophone is affected somewhat by temperature.

The correction factor is determined from the formula $$[1+(1-R_t/R_n)R_c/R_d]^2$$

where $R_n$ is the total resistance of the geophone array at the reference temperature of about 25° C., and $R_t$ is the total resistance of the geophone array at the actual geophone temperature. $R_c$ and $R_d$ are defined above. $R_t$ can be determined as follows assuming that the correction factor is applied to the integral ratio value as described below. $R_t$ can be most conveniently and easily determined by first determining the output voltage of the geophone array during application of the levitate current to the geophone array, and then dividing the levitate current into that output voltage to obtain the total resistance $R_t$ of the geophone array at the actual geophone temperature. The output voltage value used for the determination of $R_t$ should correspond to an output voltage after stabilization of the geophone array output. For example, referring to FIG. 2, an output voltage value can be selected between about 100 milliseconds and 200 milliseconds. As an alternative to selecting a voltage value at a particular time, an average voltage can be determined for a certain time period. This tends to correct for noise and is generally more accurate. $R_n$ is measured similarly by applying a test current at reference temperature conditions of about 25° C. to an identically connected geophone array which is known to properly function. For most accurate results, a number of such arrays are separately tested at reference temperature conditions and an average $R_n$ is derived for the arrays. Alternatively, $R_n$ can be calculated based on the coil resistance at reference temperature conditions ($R_c$), the damping resistance ($R_d$), and the resistance of the wire which connects the geophones.

It should be noted that the correction factor discussed above is temperature dependent because the total resistance of the geophone array at the actual geophone temperature is a function of the coil resistance, which as noted previously is temperature dependent.

The correction factor can be applied to $INT_a$. $INT_a$ is accordingly "corrected" by dividing the correction factor into $INT_a$. Essentially the correction factor when applied to $INT_a$ "corrects" this actual integral value to what it would be at the reference temperature so that the comparison to $INT_n$ is more accurate. Thus, the temperature corrected integral ratio value can be determined from $$\left(\frac{N}{C}\right)\left(\frac{INT_a}{INT_n}\right)$$

where C is the temperature dependent correction factor.

As an alternative to the correction technique described above, the correction factor or a fractional derivative (i.e. $\sqrt{C}$) thereof can be applied to the levitate current. For example, the correction factor can be divided into the desired levitate current at 25° C. (obtained from a selected displacement X for example) to obtain the actual levitate current which is applied to the geophone array. The desired levitate current at 25° C. is used to obtain $INT_n$. Alternatively, the square root of the correction factor can be applied to the levitate current, and the square root of the correction factor also applied to $INT_a$. Applying the correction factor to the current as described in either of the above alternatives requires an adjustable current source which is preferably controllable by the microprocessor. In addition, a test current must be supplied to the geophone array prior to application of the levitate current in order to derive the total geophone resistance $R_t$. Note that the correction factor must be determined before the levitate current is applied so that the total resistance $R_t$ cannot be determined by application of the levitate current itself.

Figure 3:
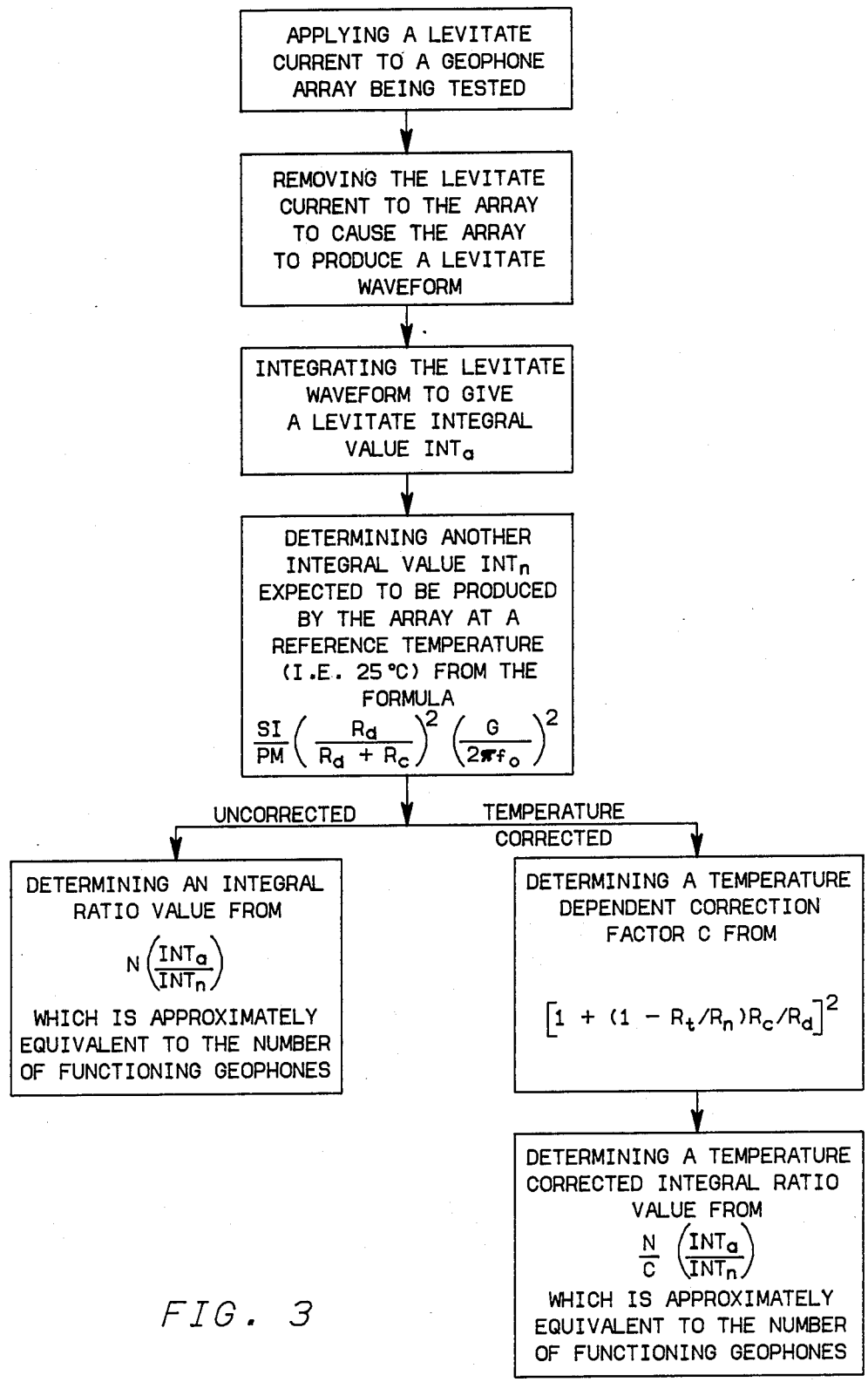
FIG. 3 is a flow chart which illustrates the various steps of preferred embodiments of the invention.

Referring to FIG. 3, there is shown a flow chart which outlines the various steps of the geophone testing method described above. An embodiment using the temperature dependent correction factor, as well as an embodiment not using the correction factor are shown.

Specific examples further illustrating the invention will now be described which should not be construed to limit the invention in any manner.

EXAMPLE I

The purpose of this example is to demonstrate the effectiveness of the invention in determining the number of properly functioning geophones in an array of geophones. The geophones tested in this example included a total of twelve geophones in a 3×4 (S×P) array, thus comprising four legs connected in parallel and three geophones connected in series in each leg.

The apparatus used to test the geophones included a constant current source for applying a levitate current to the geophone array, a sampling oscilloscope for receiving and processing signals from the geophones, and a computer for cooperating with the oscilloscope in storing and processing data as further discussed below. This apparatus is functionally equivalent to the apparatus shown in FIG. 1 as will become more apparent. The oscilloscope used was a programmable Tektronix Model 7854 sampling oscilloscope capable of digitizing and storing waveforms and subsequently performing mathematical operations on the stored waveforms. The oscilloscope includes a preamplifier, A/D converter and microprocessor similar to that shown in FIG. 1. The oscilloscope microprocessor is suitably programmed through a Tektronix Model 4052 Desk-Top Computer to compute $INT_n$ and the integral ratio values using various parameter constants which are stored in the computer. The computer therefore serves the same function as EPROM in the FIG. 1 apparatus. The computer is further programmed to compute the correction factor C and to transfer this to the oscilloscope. Results of the test, such as integral ratio values, can be displayed on the computer CRT screen.

The current source produces a selectable value of constant DC current for a period of 200 milliseconds on command from the oscilloscope. The value of current is selected by means of a variable resistor.

Each geophone used in this example was a model GSC-20DX geophone manufactured by Geospace, Inc.

of Houston, TX. Various parameter values associated with the geophones are set forth in Table IA.

TABLE IA

| Parameter | Value |
|---|---|
| Coil Mass (M) | 11 grams |
| Damping Resistance ($R_d$) | 1000 ohms |
| Coil Resistance at 25° C. ($R_c$) | 395 ohms |
| Transductance (G) | 27.6 v/m/s |
| Resonant Frequency ($f_o$) | 10 Hz |
| Total Array Resistance at 25° C. ($R_n$) | 224 ohms |

Several different tests were conducted using varying numbers of good geophones at four different temperatures. By "good" geophones is meant geophones which were known to properly function and which were properly positioned vertically during the tests. The remaining geophone(s) of the twelve geophone array were laid on their sides to render them inoperable. For example, for a test with ten good geophones, two were positioned horizontally on their sides. Therefore, in each test, the correct integral ratio value which should be obtained was known so that the accuracy of the tests can be easily evaluated. In each test, a levitate current of 1.0 milliamp was applied to the array for 200 milliseconds, followed by removal of the current to thereby produce a levitate waveform. Voltage of the array's output was sampled at about 180 milliseconds into the test. The levitate current was divided into this voltage value to obtain the total resistance $R_t$ of the geophone array at each actual test temperature. $R_n$ was calculated utilizing $R_c$, $R_d$ and the resistance of the wire connecting the geophones. A correction factor C was determined for each temperature using the $R_t$ and $R_n$ values.

The levitate waveform was integrated over a time period of 200 milliseconds and using a voltage sampling interval of 0.2 milliseconds to give an $INT_a$ value in each test. Each $INT_a$ value was employed in conjunction with the $INT_n$ value ($6.76 \times 10^{-3}$ volt-seconds) to derive an integral ratio value. The resulting integral ratio values, uncorrected and temperature corrected, as well as the values for $R_t$ and C corresponding to each test temperature, are shown in Table IB. The temperature corrected values were determined by applying the correction factor C to the integral ratio value as previously described.

It can be seen from Table IB that each uncorrected integral ratio value is extremely close to the number of good, functioning geophones at 23° C. and 35° C. Accuracy begins to deteriorate however at temperature conditions somewhere between 35° C. (about 95° F.) and 55° C. (about 130° F.). However, the data shows the test method using the uncorrected integral ratio values to work quite well except for the most extreme temperature conditions.

In contrast, Table IB shows the temperature corrected integral ratio values to be extremely accurate for all temperature conditions tested, even at 65° C. (about 150° F.). Therefore, temperature correcting the integral ratio value in accordance with the invention is particularly advantageous, especially in view of the fact that geophones in the field can reach temperatures of up to 65° C., or about 150° F., on hot summer days when in direct sunlight.

EXAMPLE II

In this example, a $3 \times 6$ (S×P) geophone array having eighteen total geophones was tested using the same apparatus and test procedure employed in Example I, except for the following. In this example, a levitate current of 1.5 milliamps was applied to the array. Also, $R_n$ was calculated to be about 157 ohms. The results are shown in Table II.

TABLE II

| Temperature (°C.) | Uncorrected Integral Ratio Values for Various Numbers of Good Geophones | | | $R_t$ (ohms) | C (no units) | Corrected Integral Ratio Values for Various Numbers of Good Geophones | | |
|---|---|---|---|---|---|---|---|---|
| | 18 | 17 | 16 | | | 18 | 17 | 16 |
| 23 | 17.8 | 16.7 | 15.5 | 160 | .99 | 17.9 | 16.8 | 15.6 |
| 35 | 17.5 | 16.4 | 15.2 | 164 | .97 | 18.1 | 16.9 | 15.7 |
| 55 | 16.9 | 15.8 | 14.7 | 172 | .93 | 18.2 | 17.0 | 15.9 |
| 65 | 16.6 | 15.5 | 14.4 | 177 | .91 | 18.3 | 17.2 | 15.9 |

The data of Table II also shows the effectiveness of the method of the invention in determining the number of functioning geophones in an array, particularly with respect to the temperature corrected integral ratio values.

SUMMATION

Thus, there is provided by the present invention an effective apparatus and method for testing geophones. Testing geophones in accordance with the invention is simple and does not require the complex computations inherent in prior techniques. Improved accuracy also results because of the integration of the levitate waveform which suppresses vibrational and electrical noise. Prior techniques which rely on voltage measurements at single points in time are particularly susceptible to such noise. Other advantages of the invention include easily interpreted results wherein a number is obtained which is directly indicative of the number of properly

TABLE IB

| Temperature (°C.) | Uncorrected Integral Ratio Values for Various Numbers of Good Geophones | | | $R_t$ (ohms) | C (no units) | Corrected Integral Ratio Values for Various Numbers of Good Geophones | | |
|---|---|---|---|---|---|---|---|---|
| | 12 | 11 | 10 | | | 12 | 11 | 10 |
| 23 | 12.0 | 10.9 | 9.8 | 226 | .99 | 12.1 | 11.0 | 9.9 |
| 35 | 11.7 | 10.7 | 9.7 | 232 | .97 | 12.1 | 11.0 | 10.0 |
| 55 | 11.3 | 10.3 | 9.4 | 243 | .93 | 12.2 | 11.1 | 10.1 |
| 65 | 11.1 | 10.1 | 9.1 | 249 | .91 | 12.3 | 11.1 | 10.1 | functioning geophones, and further include the advantage of requiring cheaper circuitry than prior techniques because less accurate voltage measurements are needed. This is because the present invention does not rely on voltage measurements at single points in time. Finally, utilization of the temperature dependent correction factor improves accuracy even further and allows accurate testing to be made in the field in extreme temperature conditions. The use of the temperature dependent correction factor is estimated to reduce the error due to temperature to about 1 percent over a temperature range of $-20°$ to $+70°$ C.

Obviously, many modifications and variations of the present invention are possible in light of the above teachings. For example, an analog integrator circuit could be used instead of the illustrated digital circuitry. In such an analog integrator circuit, the voltage associated with the levitate waveform can be integrated with respect to time by employing a voltage to frequency converter which produces a frequency proportional to the input voltage. It is therefore to be understood that within the scope of the appended claims the invention may be practiced otherwise than as specifically described.

That which is claimed is:

1. A method for testing at least one moving-coil geophone of the type which includes a movable coil which is displaceable from an original position so as to move through a magnetic field to thereby produce electrical energy, comprising:
    applying an electrical levitate current to said at least one geophone to cause displacement of said coil from its original position;
    removing said current to cause said coil to return to its original position, said at least one geophone in response thereto producing an output signal having associated therewith a levitate waveform which is characterized by voltage as a function of time;
    integrating said levitate waveform by integrating voltage with respect to time to give a levitate integral value $INT_a$ which is indicative of the operability of said at least one geophone.

2. A method as recited in claim 1 further comprising:
    determining an integral value $INT_n$ expected to be produced by said at least one geophone at a predetermined reference temperature;
    comparing $INT_n$ and $INT_a$; and
    determining the operability of said at least one geophone based on the comparison of $INT_n$ and $INT_a$.

3. A method as recited in claim 2 wherein said comparing step includes determining the ratio between $INT_a$ and $INT_n$.

4. A method as recited in claim 3 wherein said comparing step comprises determining an integral ratio value from the formula $$N\left(\frac{INT_a}{INT_n}\right)$$

where N is the total number of geophones.

5. A method as recited in claim 4 wherein said integral ratio value is approximately equivalent to the number of functioning geophones of said total number.

6. A method as recited in claim 3 further comprising:
    determining a temperature dependent correction factor;
    utilizing said correction factor to correct for errors introduced into said comparison by performing said current applying and removing steps at an actual geophone temperature different than said reference temperature.

7. A method as recited in claim 6 wherein said correction factor utilizing step and said comparing step comprises determining a temperature corrected integral ratio value from the formula $$\left(\frac{N}{C}\right)\left(\frac{INT_a}{INT_n}\right)$$

where N is the total number of geophones and C is said correction factor.

8. A method as recited in claim 7 wherein said temperature corrected integral ratio value is approximately equivalent to the number of functioning geophones of said total number.

9. A method as recited in claim 8 wherein said at least one geophone comprises an array of geophones and wherein $INT_n$ is determined from $$\frac{SI}{PM}\left(\frac{R_d}{R_d + R_c}\right)^2 \left(\frac{G}{2\pi f_0}\right)^2$$

where P is the number of legs in said array which are connected in parallel, S is the number of geophones connected in series in each leg, wherein each leg has an equal number of geophones, I is the levitate current, M is the mass of the geophone coil for each individual geophone, $R_d$ is the damping resistance for each individual geophone, $R_c$ is the coil resistance at said reference temperature for each individual geophone, G is the transductance for each individual geophone, and $f_o$ is the resonant frequency for each individual geophone.

10. A method as recited in claim 9 wherein said correction factor C is determined from the formula $$[1+(1-R_t/R_n)R_c/R_d]^2$$

where $R_n$ is the total resistance of said array at said reference temperature, $R_t$ is the total resistance of said array at said actual geophone temperature, $R_c$ is the coil resistance for each individual geophone at said reference temperature, and $R_d$ is the damping resistance for each individual geophone.

11. A method as recited in claim 10 wherein said reference temperature is about 25° C.

12. An apparatus comprising:
    at least one moving-coil geophone of the type which includes a movable coil which is displaceable from an original position so as to move through a magnetic field to thereby produce electrical energy;
    means for applying an electrical levitate current to said at least one geophone for causing displacement of said coil from its original position, said means having the capability of terminating the application of current to said at least one geophone to thereby cause said coil to return to its original position so that in response thereto said at least one geophone produces an output signal having associated therewith a levitate waveform which is characterized by voltage as a function of time; and electronic means for integrating said levitate waveform by integrating voltage with respect to time whereby a levitate integral value is obtained which is indicative of the operability of said at least one geophone.

13. An apparatus as recited in claim 12 wherein said at least one geophone comprises an array of geophones.

14. An apparatus as recited in claim 13 further comprising a display means for displaying an output from said electronic means.

15. An apparatus as recited in claim 14 wherein said electronic means comprises a microprocessor.

* * * * *